US012768745B1

(12) United States Patent
Qi

(10) Patent No.: US 12,768,745 B1
(45) Date of Patent: Oct. 20, 2026

(54) FIBER DETECTION AND ALIGNMENT SYSTEM

(71) Applicant: Neptec OS, Inc., Fremont, CA (US)

(72) Inventor: Miao Qi, Milpitas, CA (US)

(73) Assignee: Neptec OS, Inc., Fremont, CA (US)

( * ) Notice: Subject to any disclaimer, the term of this patent is extended or adjusted under 35 U.S.C. 154(b) by 153 days.

(21) Appl. No.: 18/613,820

(22) Filed: Mar. 22, 2024

(51) Int. Cl.

| | |
|---|---|
| ***G01M 11/02*** | (2006.01) |
| ***G01M 11/00*** | (2006.01) |
| ***G06T 7/73*** | (2017.01) |
| *G02B 6/42* | (2006.01) |

(52) U.S. Cl.

CPC .... *G01M 11/0257* (2013.01); *G01M 11/0221* (2013.01); *G01M 11/3181* (2013.01); *G06T 7/74* (2017.01); *G06T 7/75* (2017.01); *G02B 6/4227* (2013.01); *G06T 2207/20081* (2013.01); *G06T 2207/20084* (2013.01)

(58) Field of Classification Search

CPC . G01M 11/0221; G01M 11/0257; G06T 7/74; G06T 7/75; G06T 2207/20081; G06T 2207/20084

See application file for complete search history.

(56) References Cited

U.S. PATENT DOCUMENTS

| | | | | |
|---|---|---|---|---|
| 2003/0165283 | A1 | 9/2003 | Huang | |
| 2005/0254754 | A1 | 11/2005 | Huang | |
| 2012/0172700 | A1 | 7/2012 | Krishnan | |
| 2014/0363133 | A1 | 12/2014 | Schwarzenbach | |
| 2015/0131881 | A1 | 5/2015 | Gnanamani | |
| 2015/0238148 | A1 | 8/2015 | Georgescu | |
| 2021/0056293 | A1 | 2/2021 | Yin | |
| 2021/0150230 | A1 | 5/2021 | Smolyanskiy | |
| 2022/0301258 | A1 | 9/2022 | Song | |
| 2024/0085644 | A1* | 3/2024 | Dinkel ................ | G02B 6/3812 |

* cited by examiner

*Primary Examiner* — Kevin K Pyo

(74) *Attorney, Agent, or Firm* — Adibi IP Group, PC; Amir V. Adibi; Andrew C. Palmer

(57) ABSTRACT

A system includes an imaging system and a fiber detection and alignment system. The fiber detection and alignment system includes one or more neural networks trained to detect end faces of one or more fibers in an image and to predict rotation angle and direction of rotation for each fiber that will align an axis of the fiber to associated reference keys. In operation, the imaging system generates an image of an end face of one or more polarization-maintaining (PM) fibers to be aligned. The fiber detection and alignment system generates fiber detection information, such as bounding boxes around end faces of each fiber in the image, and fiber alignment information, such as an alignment instruction indicating a rotation angle and direction of rotation that will align fast or slow axes of each fiber to associated reference keys. The novel system provides a scalable technique to automatically align PM fiber.

18 Claims, 18 Drawing Sheets

FIBER DETECTION AND ALIGNMENT SYSTEM

PANDA POLARIZATION-MAINTAINING OPTICAL FIBER

BOW-TIE POLARIZATION-MAINTAINING OPTICAL FIBER

FAST AXIS PM FIBER ALIGNMENT

SLOW AXIS PM FIBER ALIGNMENT

FIBER DETECTION AND ALIGNMENT SYSTEM

FIBER DETECTION NEURAL NETWORK SYSTEM

FIBER ALIGNMENT NEURAL NETWORK SYSTEM

TRAINING OF FIBER DETECTION NEURAL NETWORK

TRAINING OF FIBER ALIGNMENT NEURAL NETWORK

FIBER DETECTION

FIBER ALIGNMENT

AUTOMATIC FIBER ALIGNMENT

RAW DATA OBTAINED FROM IMAGING SYSTEM

SAMPLE RESULTS

SAMPLE RESULTS

ALIGNING MULTIPLE FIBERS USING FIBER ALIGNMENT SYSTEM
(BEFORE ALIGNMENT)

ALIGNING MULTIPLE FIBERS USING FIBER ALIGNMENT SYSTEM (AFTER ALIGNMENT)

PACKAGED PM FIBER RIBBON
(PANDA TYPE)

PACKAGED PM FIBER RIBBON
(BOW-TIE TYPE)

DETECTING AND ALIGNING ONE OR MORE FIBERS

FORMING PM FIBER RIBBON USING FIBER DETECTION AND ALIGNMENT SYSTEM

FIBER DETECTION AND ALIGNMENT SYSTEM

TECHNICAL FIELD

The present invention relates generally to fiber optics, and more specifically, to fiber optic alignment.

BACKGROUND INFORMATION

Optical fibers are commonly used in communications applications. Optical fibers are desirable because they generally provide high bandwidth and low signal loss over long distances. In silicon photonics, silicon is used as an optical medium to transfer information. Silicon photonics is of particular interest in applications that require high speed and energy-efficient data transmission. Polarization-maintaining (PM) optical fibers are commonly used in silicon photonic applications. To achieve coupling efficiency between laser diodes in silicon photonics chips and PM optical fibers, and to preserve polarization states, PM optical fibers must be accurately aligned.

SUMMARY

A system includes an imaging system and a fiber detection and alignment system. The fiber detection and alignment system includes one or more neural networks trained to detect one or more end faces of polarization-maintaining (PM) fiber captured in an image and to predict a rotation angle and direction of rotation that will align each PM fiber to an associated reference key. For each fiber in the image, the system predicts the rotation angle and direction of rotation to align the slow or fast axis of the PM fiber to the associated reference key.

A PM fiber has stress rods that define a slow axis. A fast axis is perpendicular to the slow axis. In various applications, a single PM fiber is placed in a connector or multiple fibers form a multi-fiber array. Each fiber must be appropriately aligned. The system provides an efficient and scalable way to manufacture PM fiber arrays and fiber ribbons.

The end face of the PM fiber refers to the terminal surface of the fiber. Light enters or exits the fiber via the end face. The orientation of the end face is important because PM fibers are designed to preserve the polarization state of the light that propagates through the PM fibers. PM fibers are specially constructed of birefringent materials. Optical properties of PM fibers cause different polarization modes to propagate at different speeds through the PM fibers.

For optimal PM fiber performance, light must enter PM fiber in alignment with one of its principal polarization axes. The principal polarization axes are typically aligned along the slow and fast axes of the fiber.

Inspecting the end face of a PM fiber under a microscope can reveal the orientation of the fast and slow axes. Alignment of the fast and slow axes are often indicated by referring to a key or a flat side on a fiber connector. This visual indicator helps in aligning the fiber correctly with the light source or other optical components. Such alignment ensures that the desired polarization state is maintained throughout the optical system.

In operation, the imaging system of the fiber detection and alignment system generates an image of an end face of a fiber to be aligned. The image may include end faces of one or more fibers. For example, the imaging system includes a microscope having one or more magnification stages used to obtain the image of one or more end faces of fiber. The fiber detection and alignment system uses the image to generate fiber detection information and fiber alignment information. The fiber detection information identifies one or more end faces of fibers in the image. For example, the fiber detection information includes one or more bounding boxes overlaid above the end face of each fiber in the image. The fiber alignment information indicates how to rotate or adjust each fiber such that each fiber is aligned as desired in the specific application. For example, the fiber alignment information includes rotation angle and direction of rotation for each fiber that will align a fast or slow axis of each fiber to a reference key. The novel system provides a scalable technique to automatically align PM fiber.

In one embodiment, a system includes an imaging system, a fiber detection and alignment system, and a display. The fiber detection and alignment system includes one or more neural networks trained to detect an end face of a fiber in an image and to predict a rotation angle and direction of rotation that will align fiber to a desired axis. In operation, fiber detected in the image is identified on the display via a bounding box overlaid above detected fiber. The rotation angle and direction of rotation is overlaid above the image. A confidence score is optionally provided along with each prediction. The confidence score represents how likely the bounding box contains a fiber end face. In the case of images having multiple fibers, each end face in the image is identified by a bounding box and a predicted rotation angle and direction of rotation is provided.

In another embodiment, a system includes an imaging system, a fiber detection and alignment system, and a fiber rotator. The fiber detection and alignment system includes one or more neural networks trained to detect an end face of a fiber in an image and to predict a rotation angle and direction of rotation that will align a fast or slow axis of the fiber to a reference key. In operation, the fiber rotator rotates fiber using detected fiber coordinates and predicted rotation angle and direction of rotation information. For each detected fiber, a confidence score is generated indicating how likely a predicted bounding box contains a fiber end face. If any confidence score is below a configurable threshold TH1, then a flag is generated for further operator intervention or quality control process. In the case of images having multiple fibers, the fiber rotator rotates each fiber using the detected fiber coordinates and predicted rotation angle and direction of rotation information. The process is repeated until all fibers are aligned. If the alignment process repeats more times than a configurable threshold TH2, then a flag is generated for further operator intervention or quality control process.

In other embodiments, non-neural network-based techniques are used to identify fiber end faces and predict rotation angle and direction information from an image. In one embodiment, a support vector machine (SVM) algorithm is used to identify fiber end faces and predict rotation angle and direction information from an image. In one embodiment, a K-Nearest Neighbors (KNN) algorithm is used to identify fiber end faces and predict rotation angle and direction information from an image. In another embodiment, a vision based large multimodal model (LMM) is used to identify fiber in an image and generate alignment instructions. An image having one or more fiber end faces is supplied to the LMM along with a prompt. The LMM identifies fiber end faces in the image and predicts rotation angle and direction information for each detected fiber end face. One or more various other artificial intelligence methods are usable to identify fiber end faces and predict rotation angle and direction information from an image.

Further details and embodiments and methods are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1A:
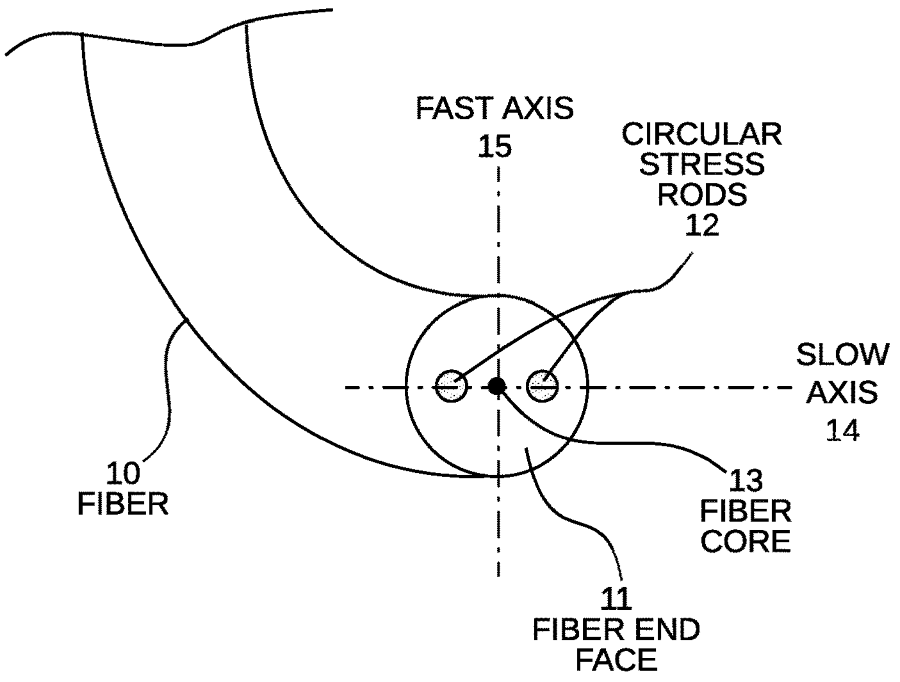
FIG. 1A is a diagram of PANDA type Polarization-maintaining (PM) fiber 10.

FIG. 1A is a diagram of PANDA type polarization-maintaining (PM) fiber 10. The PM fiber 10 includes an end face 11. The end face 11 refers to a terminal surface of the PM fiber 10 where light enters or exits the fiber 10. Stress rods 12 and a fiber core 13 are visible on the end face 11. The fiber core 13 need not be visible on the end face 11 for the novel systems and techniques disclosed herein to be utilized. A slow axis 14 is defined by a center line through the stress rods 12. A fast axis 15 is defined as being perpendicular to the slow axis 14.

Figure 1B:
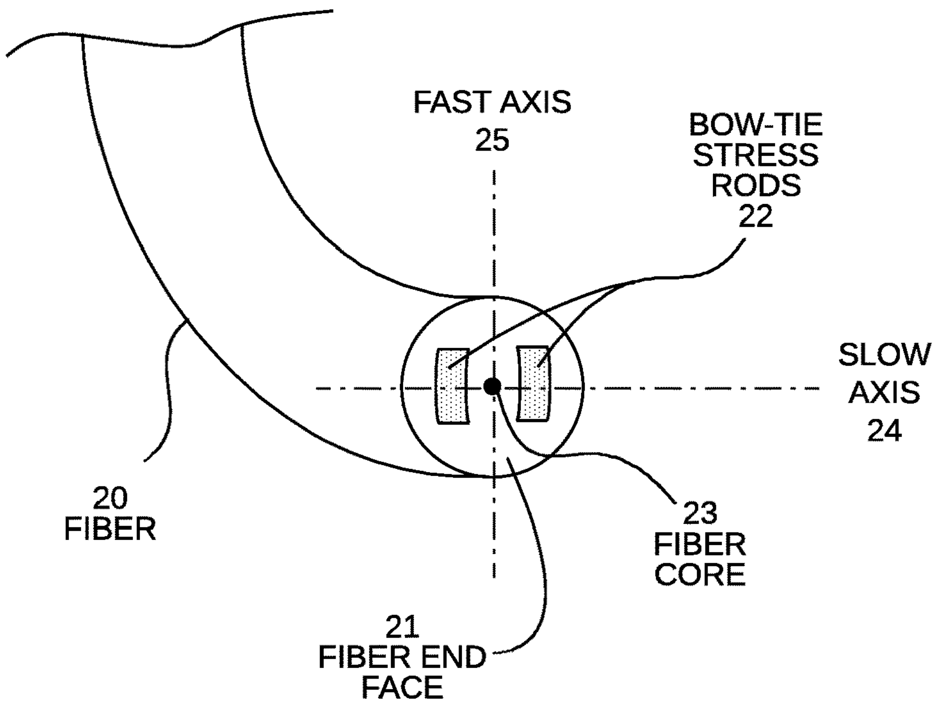
FIG. 1B is a diagram of Bow-Tie type Polarization-maintaining (PM) fiber 20.

FIG. 1B is a diagram of Bow-Tie type polarization-maintaining (PM) fiber 20. The fiber 20 includes an end face 21 and a fiber core 23. Stress rods 22 and the fiber core 23 are visible on the end face 21. The fiber core 23 need not be visible on the end face 21 for the novel systems and techniques disclosed herein to be utilized. The Bow-Tie type PM fiber 20 has trapezoidal shaped stress rods 21. A slow axis 24 is defined by a center line through the stress rods 22. A fast axis 25 is defined as being perpendicular to the slow axis 24. Although PANDA and Bow-Tie type PM fibers are common, it is appreciated that the novel systems and techniques disclosed herein may be used to align other types of PM fiber.

Figure 2A:
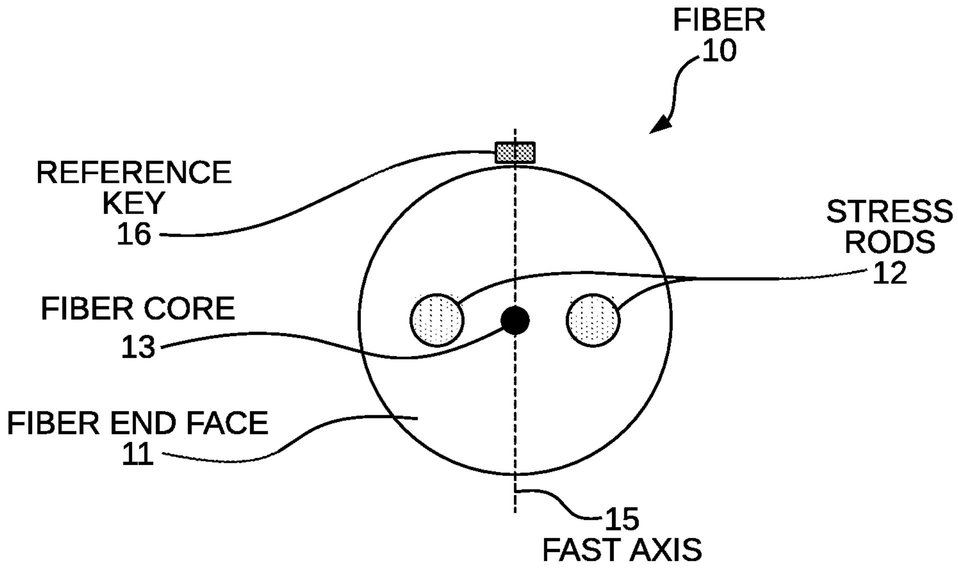
FIG. 2A is a diagram showing fast axis PM fiber alignment of the PM fiber 10.

FIG. 2A is a diagram that shows fast axis alignment of the PM fiber 10. A reference key 16 defines how the PM fiber 10 is oriented in relation to a desired axis. In this example of fast axis alignment, the reference key 16 is aligned with fast axis 15.

Figure 2B:
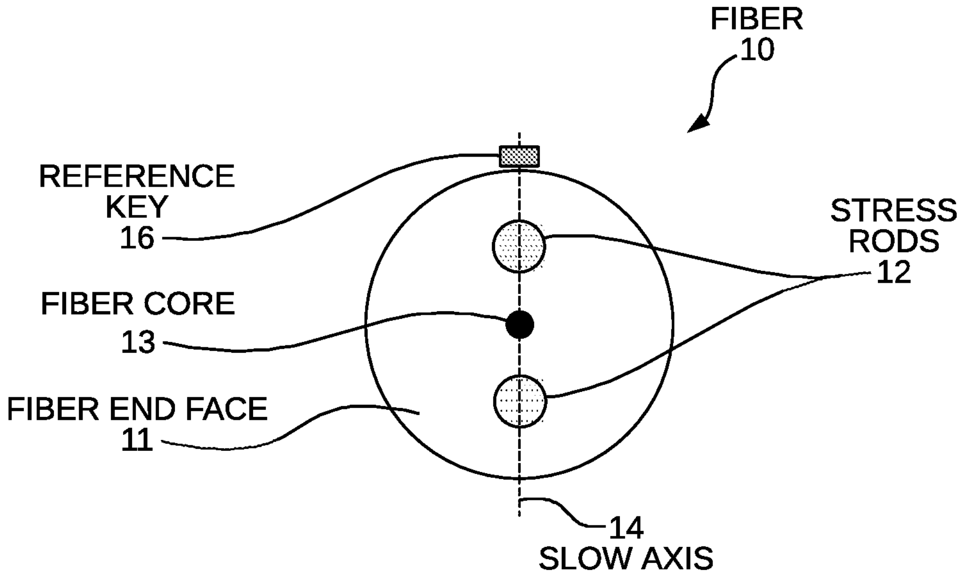
FIG. 2B is a diagram showing slow axis PM fiber alignment of the PM fiber 10.

FIG. 2B is a diagram that shows slow axis alignment of the PM fiber 10. A reference key 16 defines how the PM fiber 10 is oriented in relation to a desired axis. In this example of slow axis alignment, the reference key 16 is aligned with slow axis 14.

Figure 3:
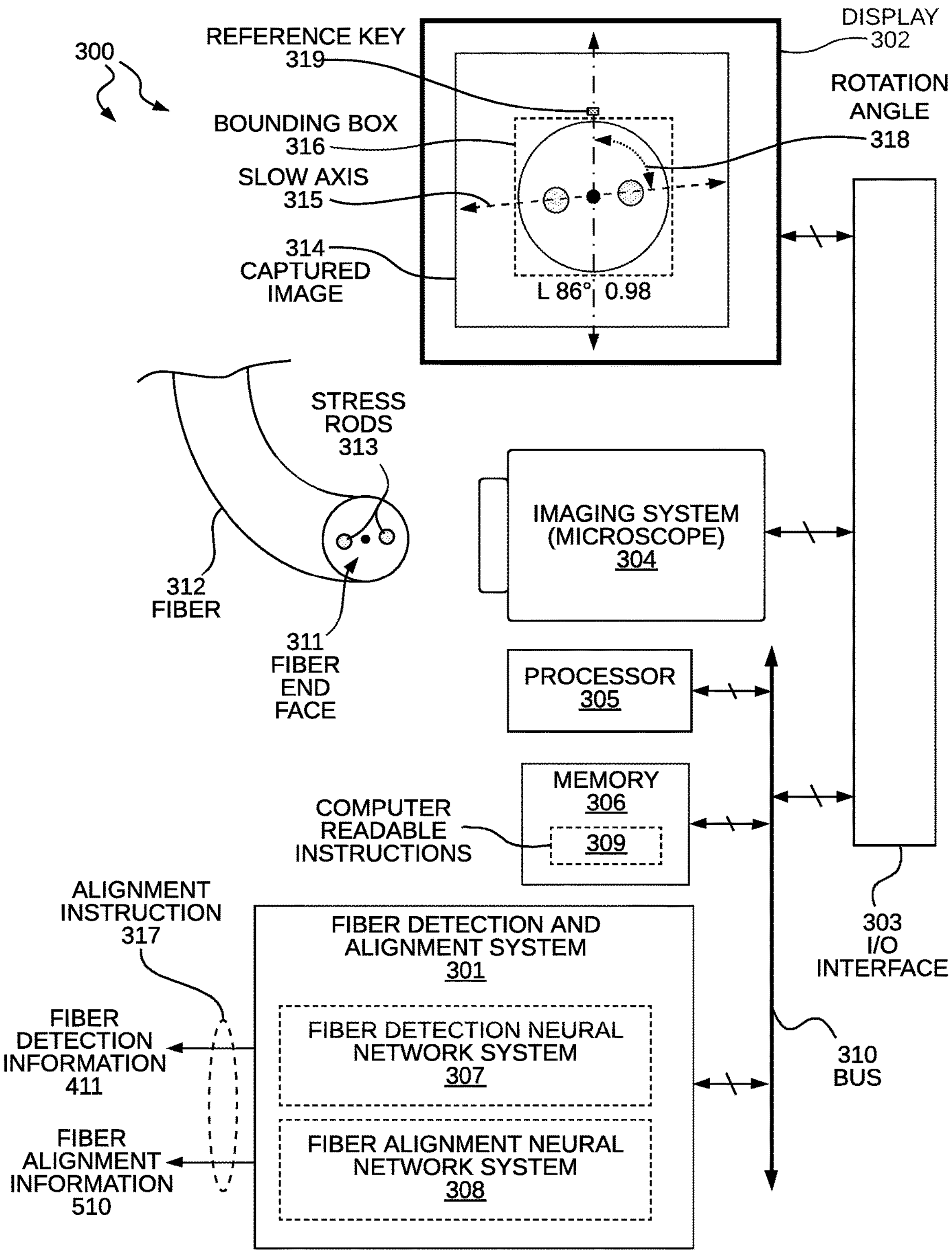
FIG. 3 is a diagram of a fiber detection and alignment system 300 in accordance with one embodiment.

FIG. 3 is a diagram of a system 300 having a fiber detection and alignment system 301 in accordance with one embodiment. The system 300 comprises display 302, interface 303, imaging system 304, processor 305, memory 306, and communication bus 310. The fiber detection and alignment system 301 comprises a fiber detection neural network system 307 and a fiber alignment neural network system 308.

The display 302 is any suitable hardware operable to present digital information to an operator, such as a display or virtual headset. The input/output interface 303 is any suitable hardware capable of interfacing with input or output devices, such as microscopes, cameras, touch displays, keyboards, networks, workstations, computers, laptops, and other devices. The imaging system 304 is any imaging hardware capable of obtaining images of fiber end faces. In one example, the imaging system 304 is a digital microscope that generates a magnified image of one or more fiber end faces. The processor 305 is any suitable processor capable of interpreting or executing instructions. Memory 306 is a computer-readable medium that includes any kind of computer memory such as floppy disks, conventional hard disks, CD-ROMS, Flash ROMS, non-volatile ROM, RAM, and non-volatile memory. Memory 306 stores an amount of computer readable instructions 309.

The fiber detection neural network system 307 and the fiber alignment neural network system 308 employ various artificial intelligence techniques to detect fiber and predict how to rotate fiber to be in desired alignment. It is appreciated that various machine learning techniques and/or deep learning models may be utilized to realize the fiber detection neural network system 307 and the fiber alignment neural network system 308. In one embodiment, the fiber detection neural network system 307 is realized using a "You only look once" (YOLO) state-of-the-art real-time object detection system and the fiber alignment neural network system 308 is realized using a residual convolution neural network (ResNet). In various embodiments, other artificial intelligence architectures are employed in identifying fiber end faces and predicting rotation angle information.

During operation of the system 300, the processor 305 interprets or executes computer readable instructions 309 stored in the memory 306 to control the imaging system microscope 304 to capture an image of an end face 311 of a fiber 312. The end face 311 includes stress rods 313. The captured image 314 is shown on the display 302.

Figure 14:
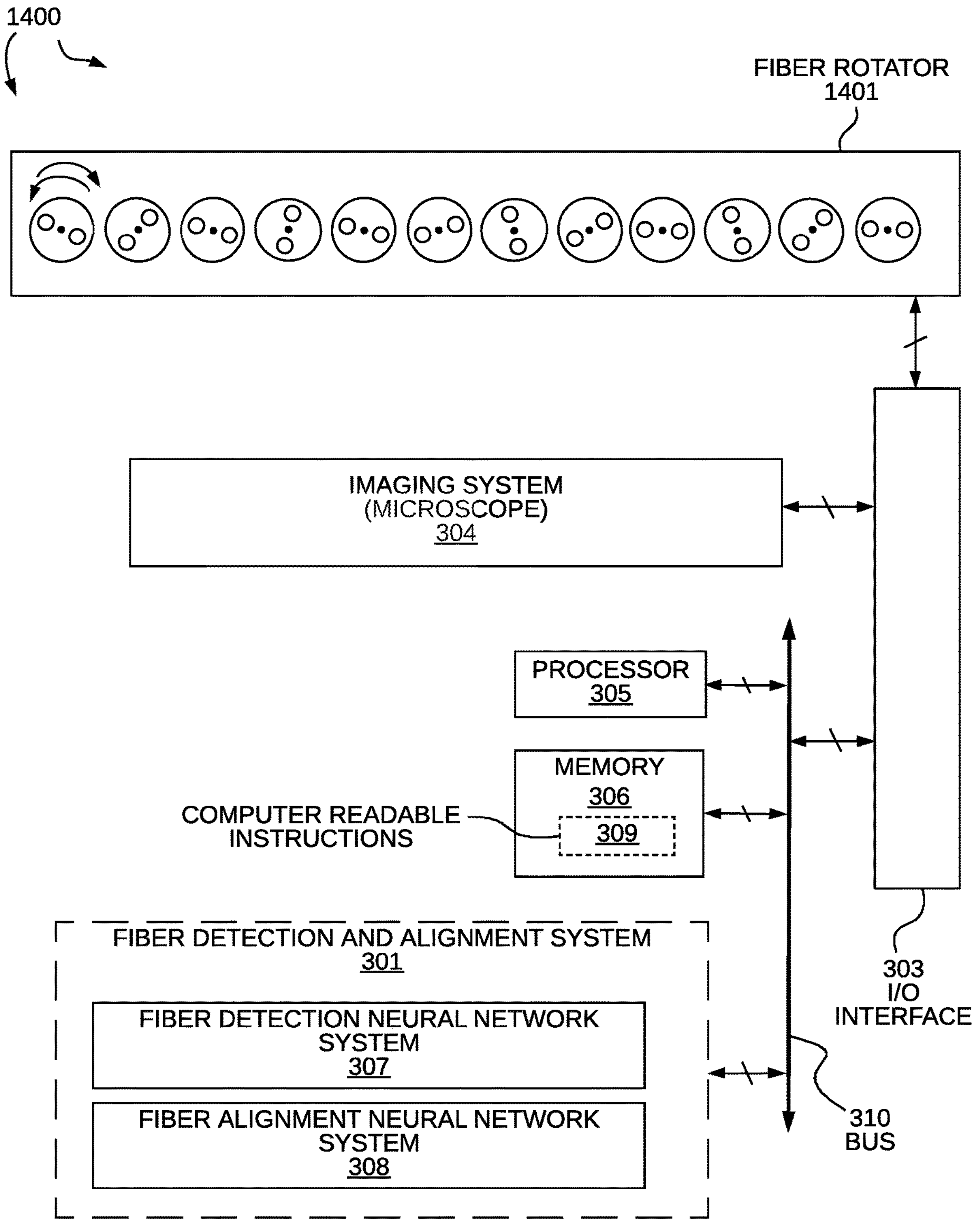
FIG. 14 is a diagram of a system 1400 having a fiber rotator 1401 operable to align a PM fiber array.
Figure 15:
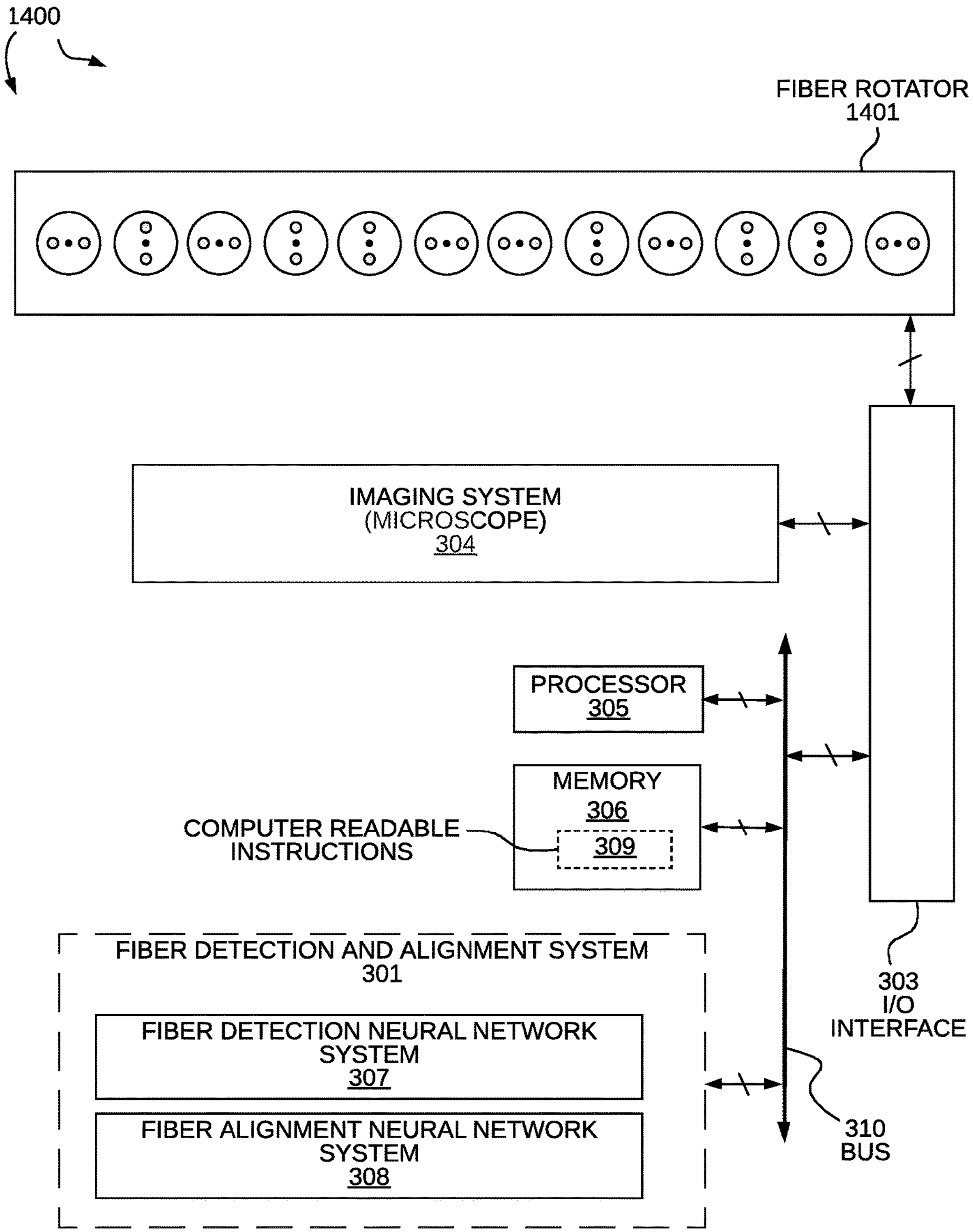
FIG. 15 is a diagram of the system 1400 after the fiber rotator 1401 aligns the PM fiber array.

The fiber detection neural network system 307 operates to detect the stress rods 313 within the captured image. In one embodiment, the fiber detection neural network system 307 defines a bounding box 316 around the captured fiber image. The fiber alignment neural network system 308 operates to determine a rotation angle 318 of a slow axis 315 in relation to a reference key 319. For example, as illustrated on the display 302, the detected rotation angle 318 is eighty-six degrees (86°) left (L) or counterclockwise for slow-axis alignment. The confidence score is shown as 0.98 indicating high confidence that the bounding box contains a fiber end face. Once the fiber detection neural network 307 detects the fiber and the fiber alignment neural network 308 predicts the alignment information, an alignment instruction 317 is generated that includes fiber detection information 411 and fiber alignment information 510. In this embodiment, the bounding box 316, the slow axis 315, and rotation angle 318 are shown on display 302 overlaid above the image 314 of the end face of the fiber 312. In other embodiments, bounding box 316, slow axis 315, and rotation angle 318 are not shown on display 302 and are instead routed to a mechanical rotator that automatically aligns fiber as shown in FIG. 14 and FIG. 15.

Figure 4:
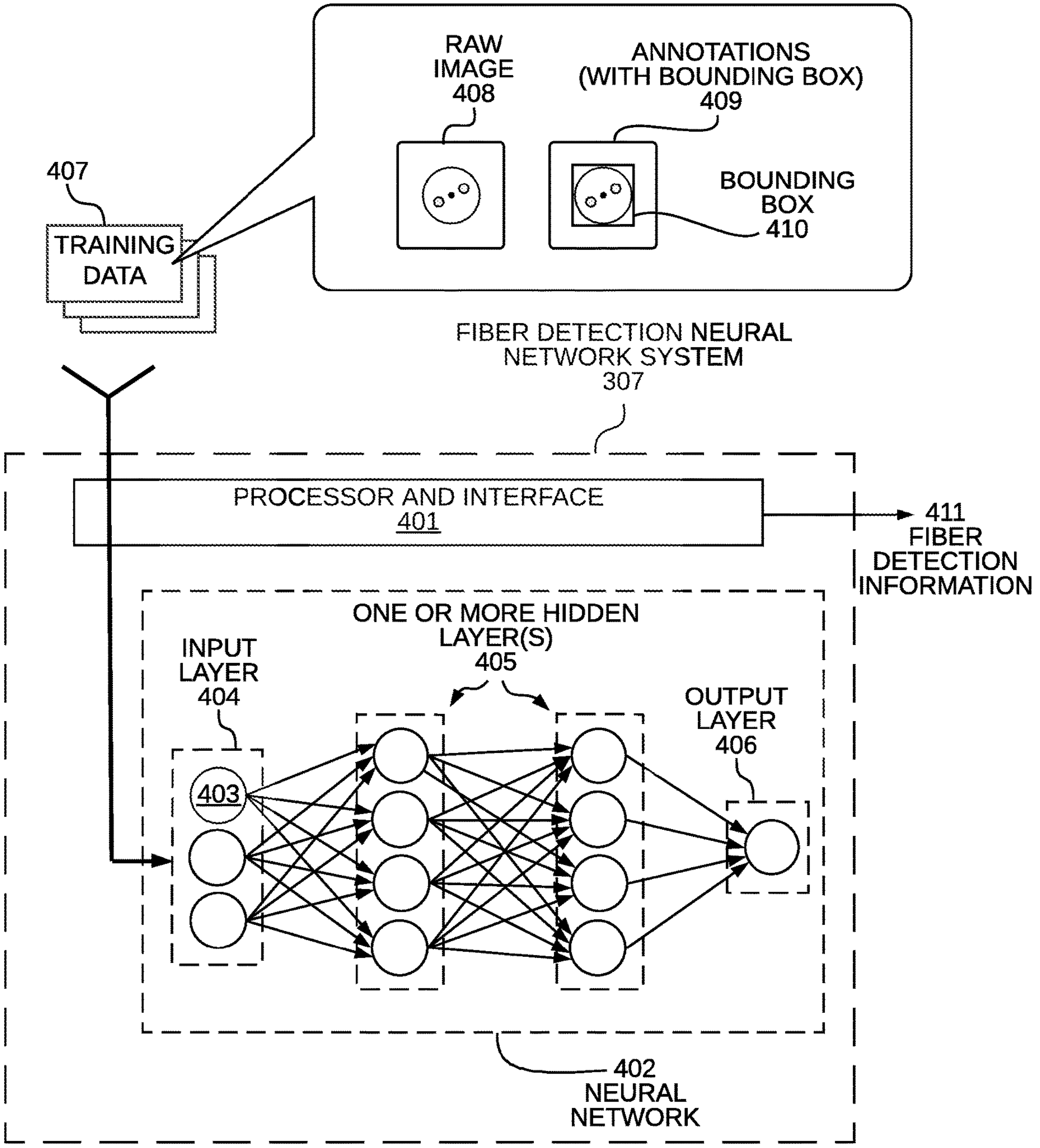
FIG. 4 is a detailed diagram of a fiber detection neural network system.

FIG. 4 is a detailed diagram of the fiber detection neural network system 307. The system 307 comprises a processor and interface 401 and neural network 402 having layers of nodes. Reference numeral 403 identifies a node of the neural network 402. The neural network 402 comprises an input layer 404, one or more hidden layers 405 and an output layer 406. Training data 407, comprising raw image data 408 and annotations 409 having a bounding box 410, is sent to the input layer 404 to train the neural network 402. For each fiber end face in the image, there is a corresponding bounding box in the annotation file. In one embodiment, the bounding box is stored in the format, "<object-class> <x-center> <y-center> <width> <height>", however bounding boxes may be stored in other formats. The processor and interface 401 output the determined fiber detection information 411 from the input data.

Figure 5:
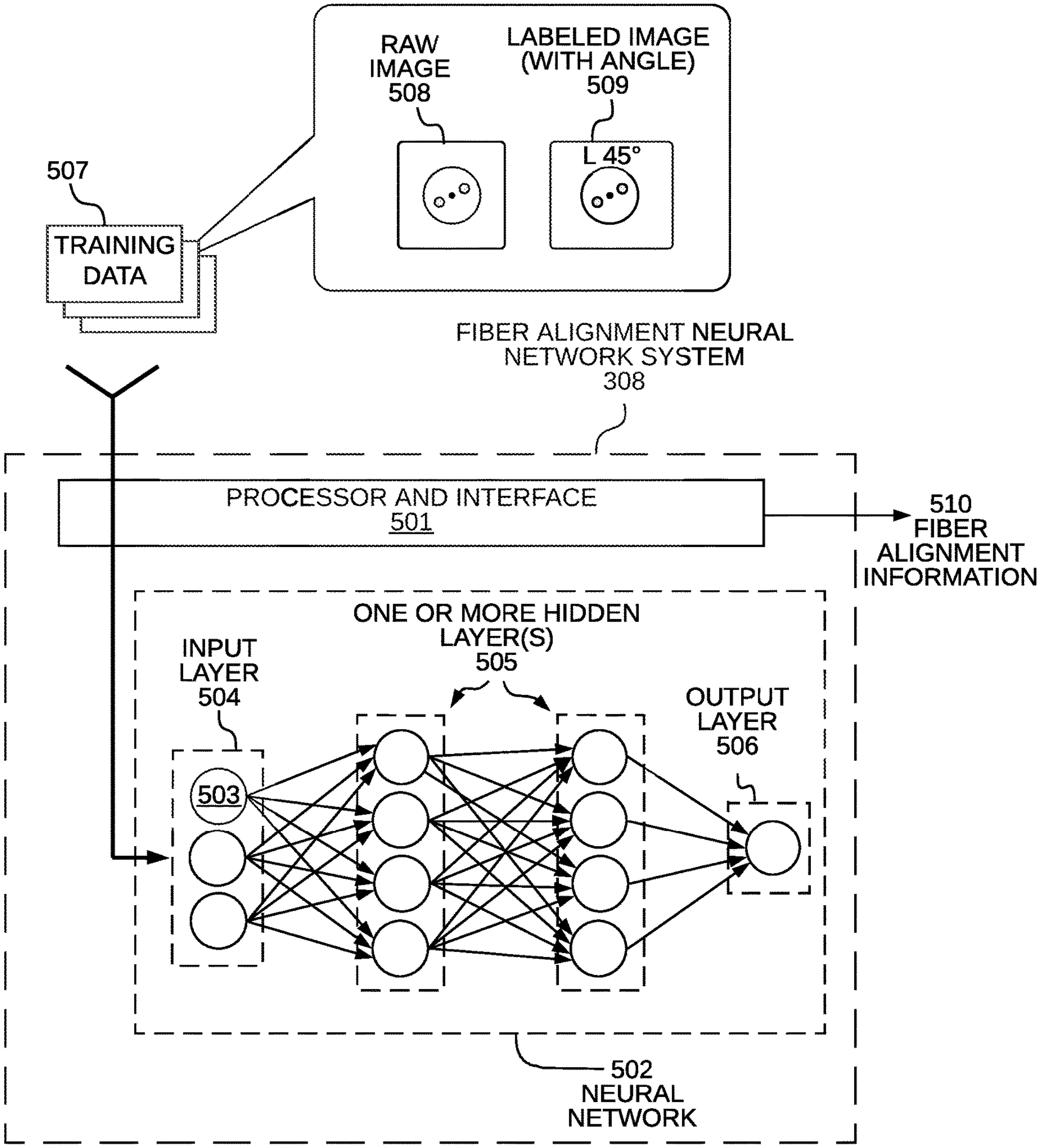
FIG. 5 is a detailed diagram of a fiber alignment neural network system.

FIG. 5 is a detailed diagram of the fiber alignment neural network system 308. The system 308 comprises a processor and interface 501 and neural network 502 having layers of nodes. Reference numeral 503 identifies a node of the neural network 502. The neural network 502 comprises an input layer 504, one or more hidden layers 505 and an output layer 506. Training data 507, comprising raw image data 508 and labeled image data (with rotation angle) 509 is sent to the input layer 504 to train the neural network 502. The processor and interface 501 output the determined fiber alignment information 510 from the input data.

Figure 6:
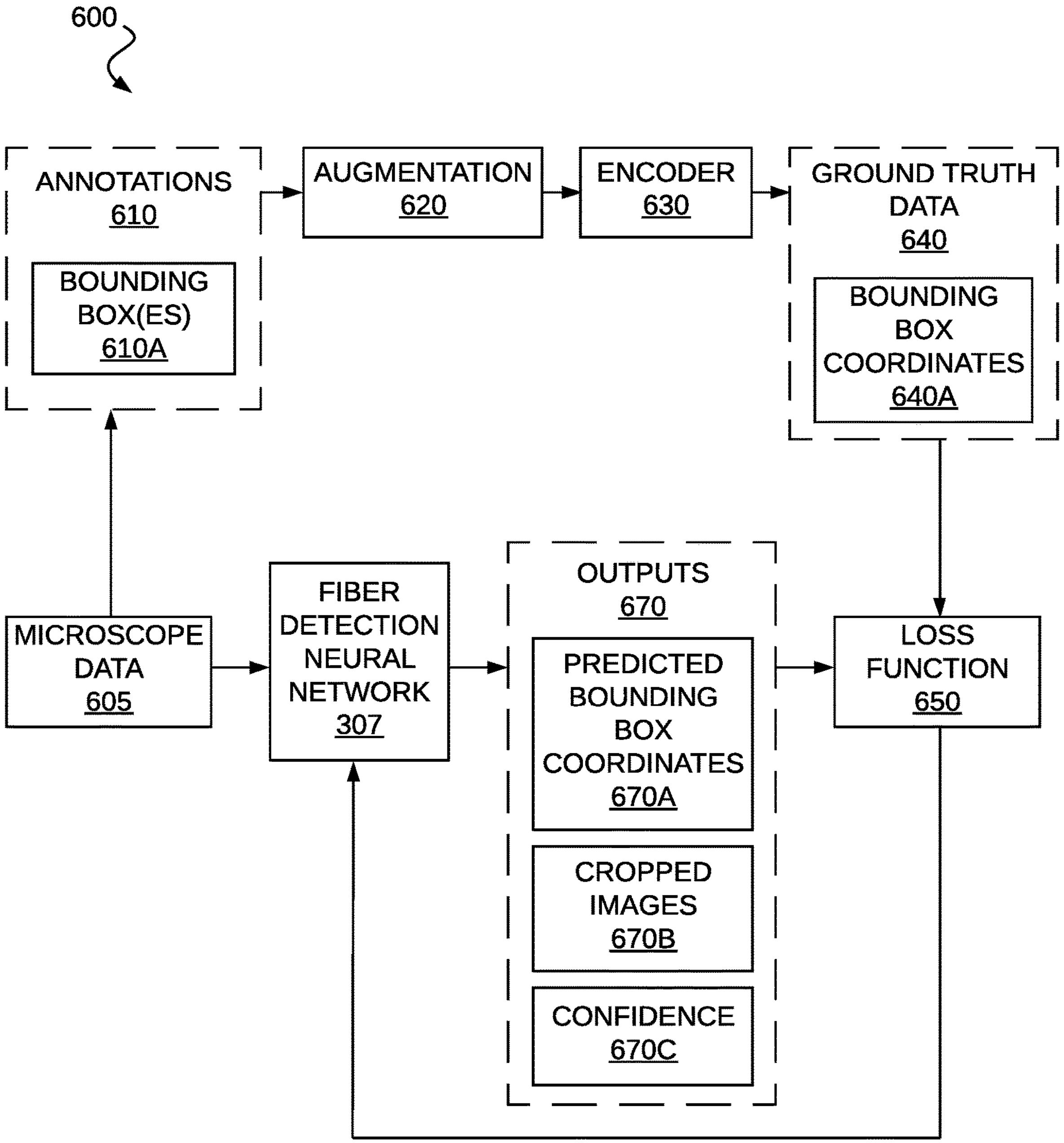
FIG. 6 is a block diagram showing how the fiber detection neural network system is trained in accordance with one training technique.

FIG. 6 is a block diagram showing how the fiber detection neural network system 307 is trained in accordance with one training technique. The training data includes captured microscope data 605. The microscope data 605 includes fiber end face data collected through any suitable data collection strategy. For each captured data 605, a corresponding annotation 610 is created. Annotation 610 is also referred to as a "label" or "labeled data" in the art. Annotation 610 includes bounding box(es) 610A for fiber end faces in the captured image. The annotation 610 is generated through online labeling tools or any other suitable annotation software.

To reduce the risk of model overfitting and increase model stability, data sets are artificially expanded with augmentation. Data augmentation 620 is done through online image augmentation applications, software programs, or built-in functions of computer vision models. Example augmentation techniques include rotation, flipping, distortion, brightness adjustment, contrast adjustment, and noise addition. An encoder 630 encodes annotations 610 as ground truth data 640 for fiber detection neural network 307. In this embodiment, bounding box(es) 610A are encoded as bounding box coordinates 640A for training. The feedback of loss function 650, a function that computes errors between predicted bounding box coordinates 670A and ground truth bounding box coordinates 640A, is used to update parameters of fiber detection neural network 307. The outputs 670 of fiber detection neural network 307 include predicted bounding box coordinates 670A of each detected fiber, cropped images 670B based on coordinates 670A, and a confidence score 670C. The confidence score 670C indicates how likely the predicted bounding box contains a fiber end face.

A threshold for the confidence score is adjustable based on different environments. For example, if the fibers are polished to have clearly visible stress rods and clean, a higher threshold could be set to avoid incorrect identification of fibers. In the case of automated fiber rotation, as in FIG. 14 and FIG. 15, thresholds are increased further to trigger operator intervention thereby ensuring quality control.

Figure 7:
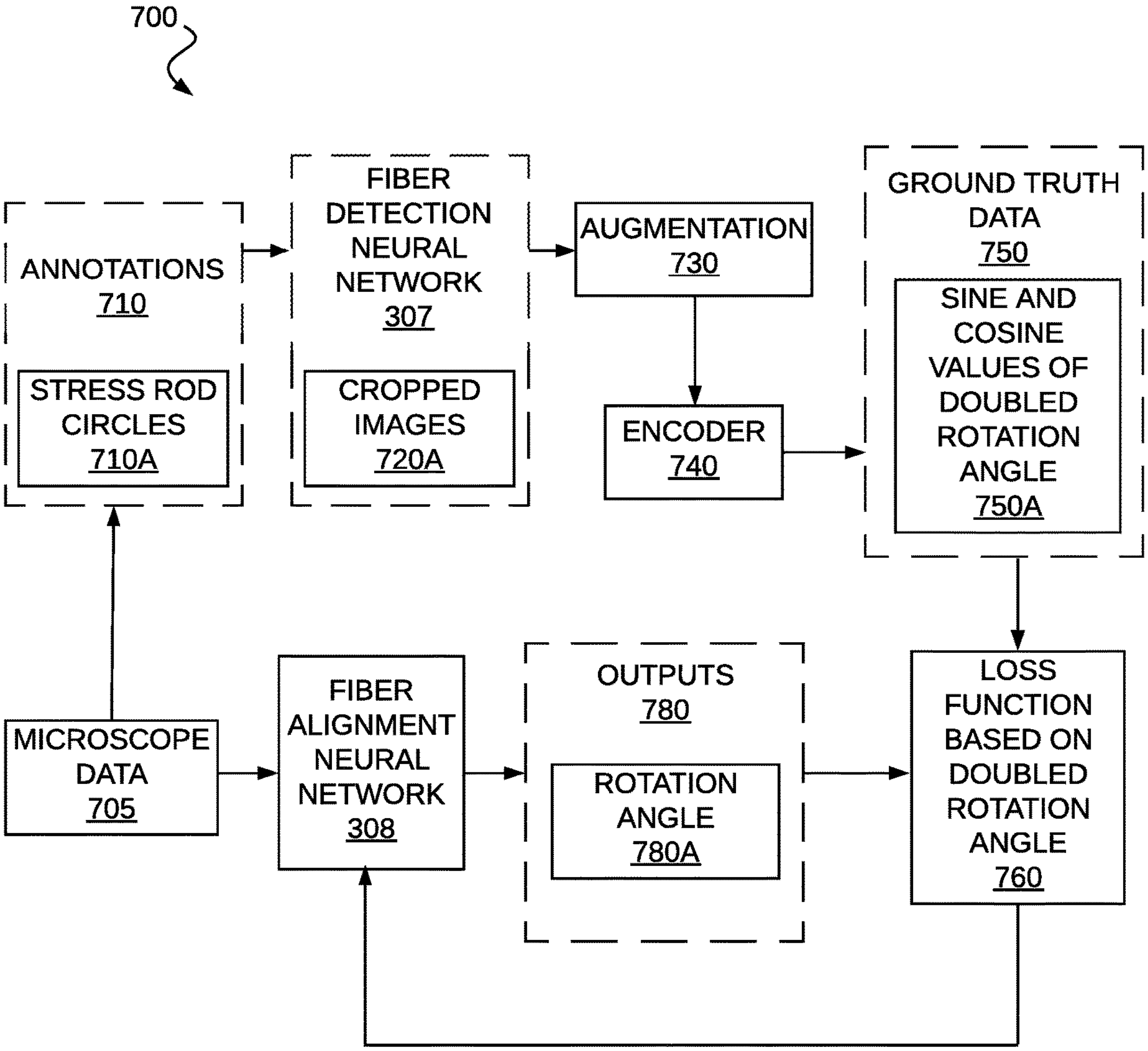
FIG. 7 is a block diagram showing how the fiber alignment neural network system is trained in accordance with one training technique.

FIG. 7 schematically illustrates method 700 for training the fiber alignment neural network 308 of the fiber detection and alignment system 301 of FIG. 3 according to embodiments of the present invention. The training data includes cropped image 720A, which are outputs from fiber detection neural network 307 using the captured microscope data 705, and augmented data through augmentation 730. For each captured data 705, a corresponding annotation 710 is created. The annotation 710 includes stress rod circles 710A, which further includes the center coordinate and radius of stress rods of captured stress rod circles. The annotation 710 are generated through online labeling tools or any other suitable annotation software suitable to define the centers of two stress rods, which are important for polarization-maintaining fiber alignments. For polarization-maintaining fiber alignments, the maximum rotation angle 318, which is the acute angle between a reference, index, or positioning key and the slow axis, is 90°. Thus, the label of each image becomes a real number belonging to the set (−90°, 90°].

To reduce the risk of model overfitting and increase model stability, the data sets are artificially expanded with augmentation. Data augmentation 730 is done through online image augmentation applications, software programs, or built-in functions of computer vision models. The use of augmentation techniques is limited in this embodiment to avoid image distortion. Techniques that may cause severe distortions or excessive augmentation are generally avoided due to undesirably impacting identification of stress rods. For example, severe image augmentation could result in too much brightness being added to the image thereby rendering both stress rods invisible. Additionally, for each of the original images captured from the microscope, the image is rotated multiple times from 0.1° to 359.9° to ensure a balance of labels in the training dataset.

An encoder 740 encodes annotations 710 as ground truth data 750 for neural network 308. In this example, stress rod circles 710A are transformed to a rotation angle between the line through the stress rod centers and the vertical axis of the coordinates and are encoded as the sine value $y_1$ and cosine value $y_2$ of doubled rotation angle θ for training.

$$\theta' = 2 \times \theta$$

$$y_1 = \sin(\theta')$$

$$y_2 = \cos(\theta')$$

In this example, sine and cosine values of the doubled rotation angle are used to update parameters of fiber alignment neural network 308. The sine and cosine values are used instead of the targeted rotation angle to obtain feedback from the loss function 760 that computes errors between predicted and ground truth sine and cosine values 750A. The outputs 780 of fiber alignment neural network 308 include predicted rotation angle $\theta_{pred}$ 780A that is transformed from predicted sine value $y_{1\_pred}$ and cosine value $y_{2\_pred}$ of doubled predicted rotation angle $\theta_{pred}$.

$$\theta'_{pred} = a\tan2(y_{1\_pred}, y_{2\_pred})$$

$$\theta_{pred} = \frac{\theta'_{pred}}{2}$$

In this example, sine and cosine values of the doubled rotation angle are used instead of the rotation angle itself because fibers with misaligned angles of −90° and 90° have the same appearance. This avoids the discontinuity in predictions on images having the same appearance.

The deep neural networks of the fiber detection neural network 307 and fiber alignment neural network 308 are fine-tuned separately using additional images that contain situations not mentioned herein thus allowing adaptation to other user-specific cases.

Figure 8:
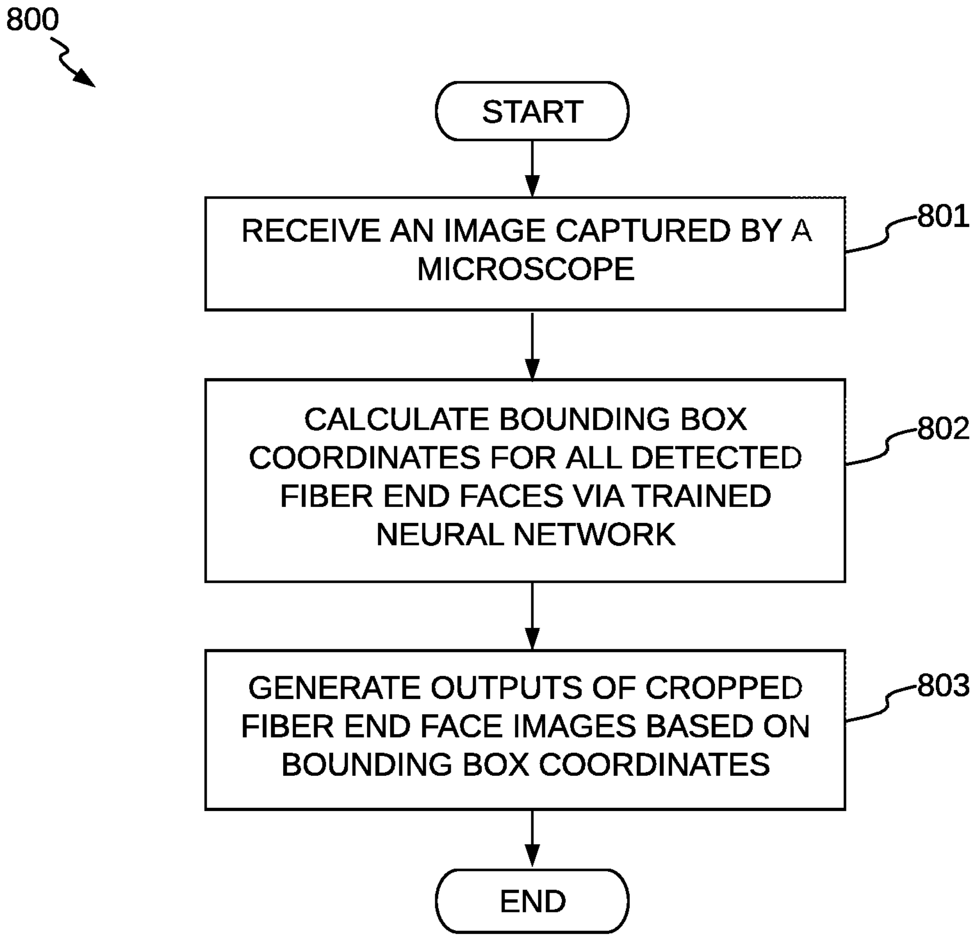
FIG. 8 is a flowchart of a method 800 for showing how the fiber detection neural network system generates fiber detection information in one embodiment.

FIG. 8 is a flowchart of a method 800 for how the fiber detection neural network system 307 generates fiber detection information in one embodiment. For example, the method 800 operates to generate cropped fiber end face images according to some embodiments. At step 801, an image input is received by fiber detection neural network 307. At step 802, the trained deep fiber detection neural network 307 calculates bounding box coordinates for each detected fiber end face in the input image and provides a confidence score. At step 803, a set of cropped images that include a single fiber end face is generated based on the estimated bounding box coordinates.

Figure 9:
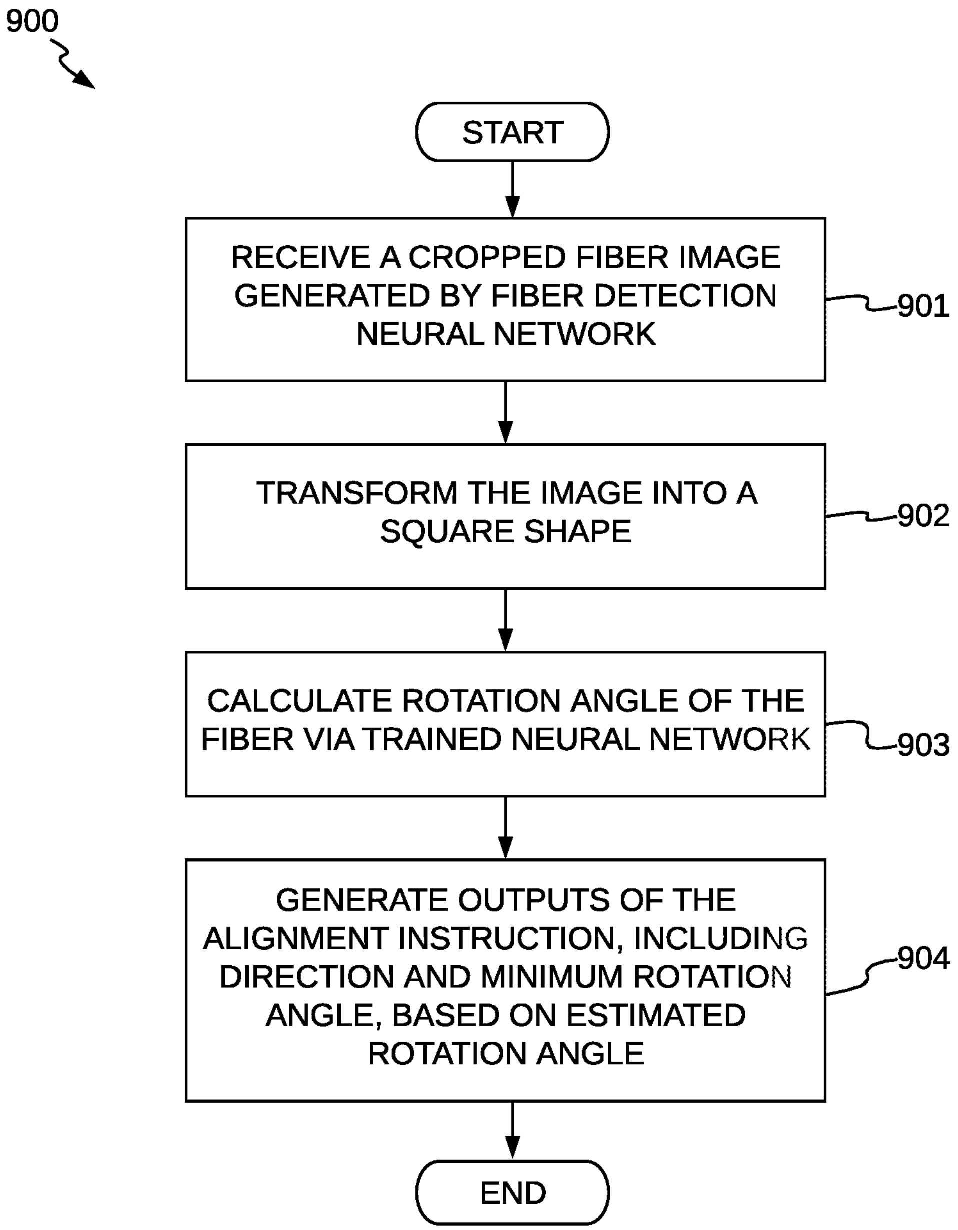
FIG. 9 is a flowchart of a method 900 for showing how the fiber alignment neural network system generates fiber alignment information in one embodiment.

FIG. 9 is a flowchart of a method 900 showing operation of the fiber alignment neural network 308 to generate alignment instructions according to some embodiments. At step 901, an image that contains a single fiber end face is received. Due to the properties of a deep neural network, to avoid aspect ratio changes that could distort the original image, a center square crop method is applied to the input image. The method picks the shorter side from the width and height of the input image and crops from both ends of the longer side. For example, if the input image is 640×480, a 480×480 image is cropped from the center. At step 902, the image is transformed into a square shape. At step 903, the trained fiber alignment neural network 308 calculates a rotation angle for the fiber in the image. At step 904, the rotation angle is further processed into an alignment instruction, consisting of a rotation angle and a direction. The instruction can be used to guide a fiber rotation device for automatic fiber alignment.

Figure 10:
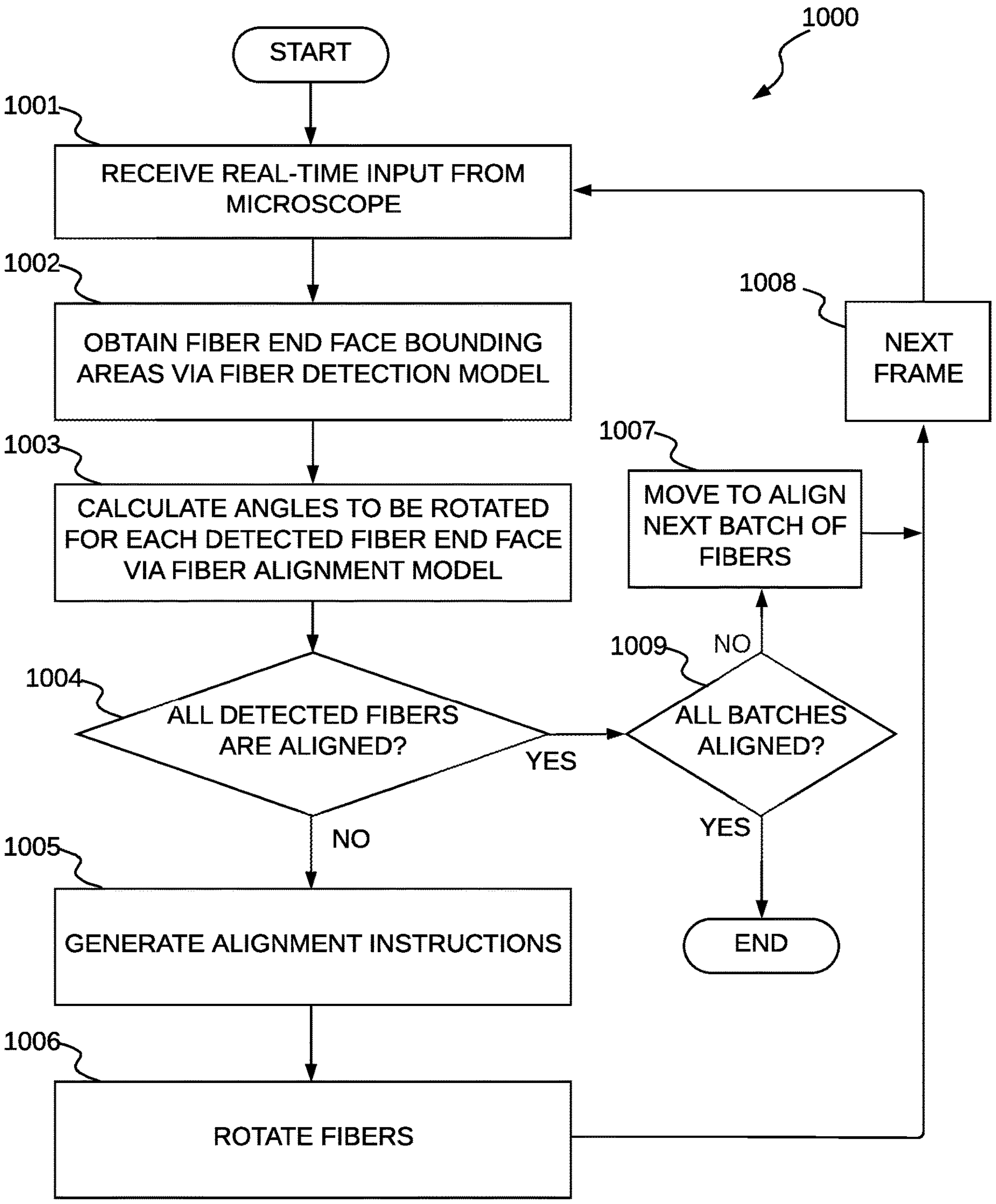
FIG. 10 is a flowchart of a method 1000 for automatic detection and alignment of one or more PM fibers using the fiber detection and alignment system 300.

FIG. 10 is a flowchart of a method 1000 for automatically aligning one or more PM fibers using the fiber detection and alignment system 300. For example, the method 1000 includes operations for operating the two-stage system 300 shown in FIG. 3.

At step 1001, a real-time input from a digital device that can capture fiber end face images is provided as input to the two-stage detection and alignment system 300. In one embodiment, the time interval to send the next live frame to the system 300 is decided by the operation time of a fiber rotation device.

At step 1002, the fiber detection neural network 307 labels the areas of detected fiber end face using bounding boxes and crops the bounded areas into images containing a single fiber end face.

At step 1003, fiber alignment neural network 308 takes the cropped image of output by fiber detection neural network 307 and predicts the misaligned angle for each detected fiber.

At step 1004, a determination is made as to whether any fiber is misaligned. When all misaligned angles are 0° or within a tolerance (e.g., 0.5°) from calculation of fiber alignment neural network 308, method 1000 proceeds to step 1007, where the fiber rotation device moves to the next batch of fibers. Otherwise, method 1000 proceeds to step 1005.

At step 1005, outputs from fiber detection neural network 307 and fiber alignment neural network 308 are put together to generate a set of instructions on how to rotate each detected fiber. The instructions comprise a position of the detected fiber end face, direction of rotation, and rotation angle.

At step 1006, based on the instructions from step 1005, the fiber rotation device rotates fibers simultaneously.

Every time that the fiber rotation device executes an operation, either after step 1007 or 1006, method 1000 will move to step 1008 to ask for the next frame from the digital camera or microscope and execute processes 1001-1003 until all fibers are aligned. For the same batch of fibers, processes 1001-1006 may be executed multiple times. For example, the fiber rotation device may not be able to accurately rotate the angle provided by the instruction due to mechanical capabilities or issues. At step 1009 a determination is made as to whether all fiber batches have been aligned. If all batches have been aligned, the method 1000 ends. If all batches have not been aligned, the method 1000 proceeds to step 1007.

To ensure that the system 300 can perform correctly under different conditions, especially for those conditions that are hard for the existing methods to work, a carefully designed data collection strategy plays a key role to help deep neural networks learn important features.

Figure 11:
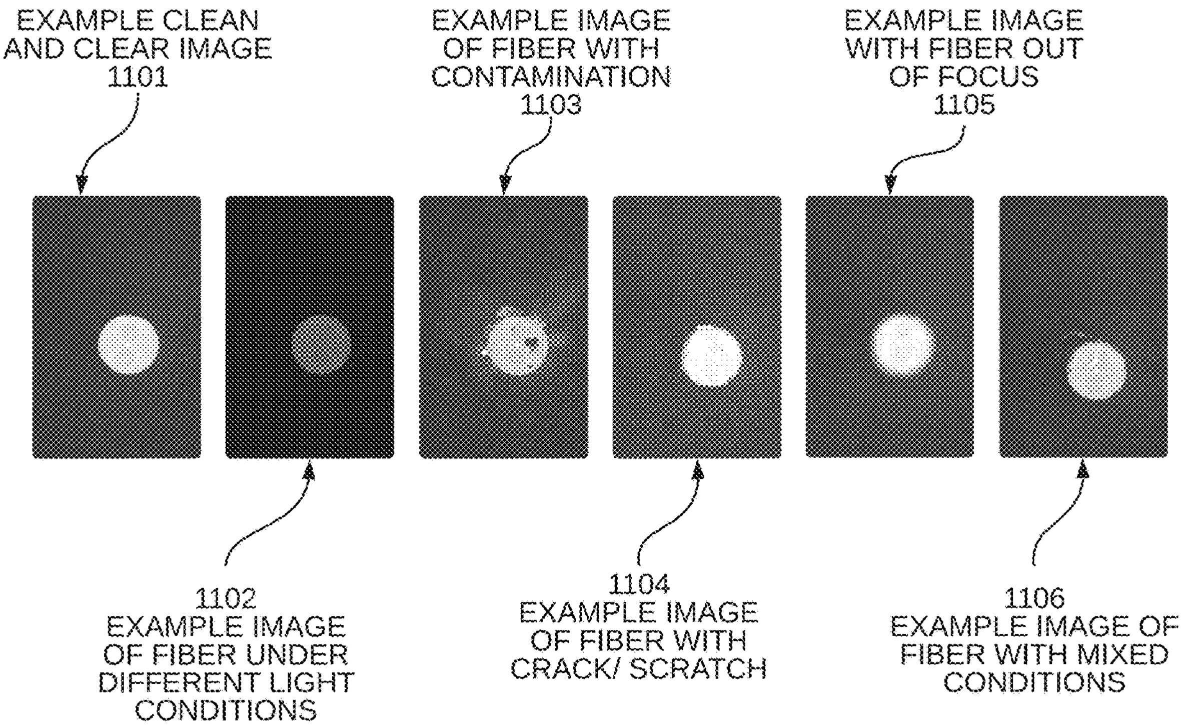
FIG. 11 shows an example of collected images under different conditions for training.

FIG. 11 shows an example of collected images under different conditions for training. For each fiber at a fixed position, which means that the misaligned angle between the reference key and the slow axis of fiber is the same, different conditions are applied. Various conditions are shown in FIG. 11, including clean and clear fiber end face 1101, clean and clear fiber end face under different light conditions 1102, contaminated fiber end face 1103, fiber end face with damages 1104, fiber end face out of focus 1105, and fiber end face under a combination of conditions 1106.

The sequential order to generate the training dataset is: (a) strip, cleave, and clean polarization-maintaining fibers to get a clear and clean fiber end face, (b) add contaminations such as dirt on the fiber end face, (c) remove contaminations and add scratch and/or cracks using polishing paper with different grade and grits, and (d) add contaminations again. For each step from (a) to (d), different light conditions, magnifications, and blur effects are applied additionally.

When labeling the images for deep neural network training in the fiber alignment neural network 308, the images with unclear or invisible stress rods cannot be identified directly from the image to calculate target misaligned angles. However, since the data collection strategy ensures each of these images has a corresponding clear and clean image (e.g., image 1101), the rotational alignment label can be obtained from that image.

Figure 12:
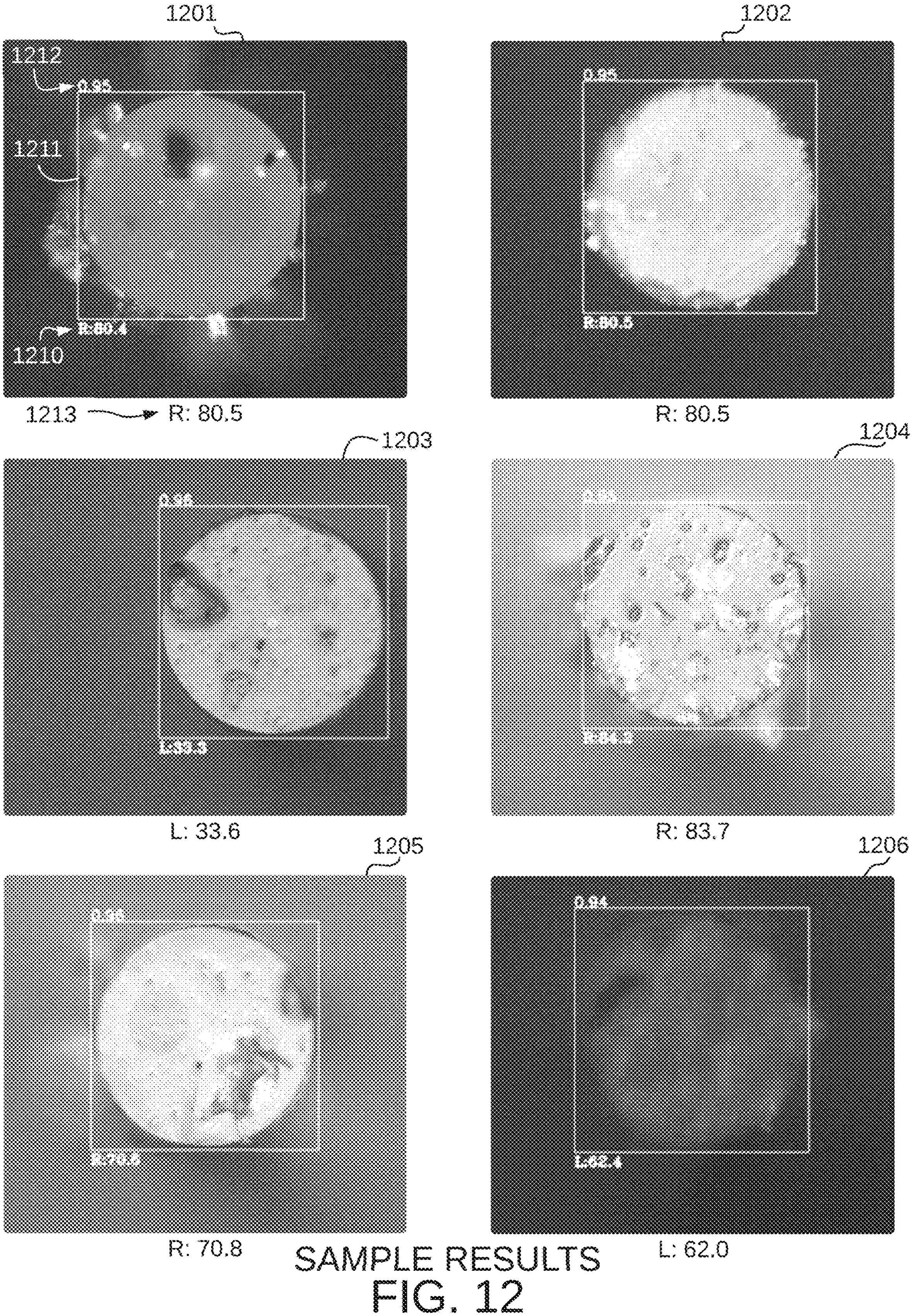
FIG. 12 shows model performance under different image and fiber conditions.

FIG. 12 shows model performance under different image and fiber conditions. For each fiber end face image, predicted misaligned angle information is presented overlaid above the image along with ground truth information, a predicted bounding box, and a confidence score. For fiber end face images with two detectable stress rods, such as in images 1201, 1202, and 1203, whatever the fiber end faces have contamination, cracks, scratches, or are under different illumination conditions, the difference between predicted rotation angle and true rotation angle is within 0.5°. For fiber end face images with one or more stress rods that are unclear, such as in images 1204, 1205, and 1206, the difference between predicted rotation angle and true rotation angle may be a little higher. In some images, one or both stress rods cannot be clearly detected or can be only partially detected by human eyes. For image 1201, reference numeral 1210 identifies predicted misaligned angle information ("R: 80.4"), reference numeral 1211 identifies a predicted bounding box, reference numeral 1212 identifies a confidence score ("0.95"), and reference numeral 1213 identifies ground truth information ("R: 80.5").

Most of the fiber end faces can be successfully detected and the misaligned angle can be accurately calculated with a tolerance of ±1°. The system is able to predict the rotation angle when fiber and/or image conditions are too hard for traditional methods to achieve the same target. Faulty fiber or image conditions usually means that two stress rods of fiber cannot be clearly detected in the image. From the perspective of fibers, contamination and/or damages on the fiber end face can prevent stress rods from being clearly detected. From the perspective of images, blurs, low contrast between stress rods and the rest of fiber, and low magnification of microscope all can make stress rods unclear or invisible. Various embodiments allow for automatic fiber alignment without excessive cleaning, polishing, or cleaving. This avoids very time consuming traditional methods and is not limited by the different magnification ratio or lighting conditions available in different digital cameras or microscopes thereby further reducing costs.

The disclosed system for automatic fiber alignment can be applied to different numbers of fibers under different conditions in real-time.

Figure 13:
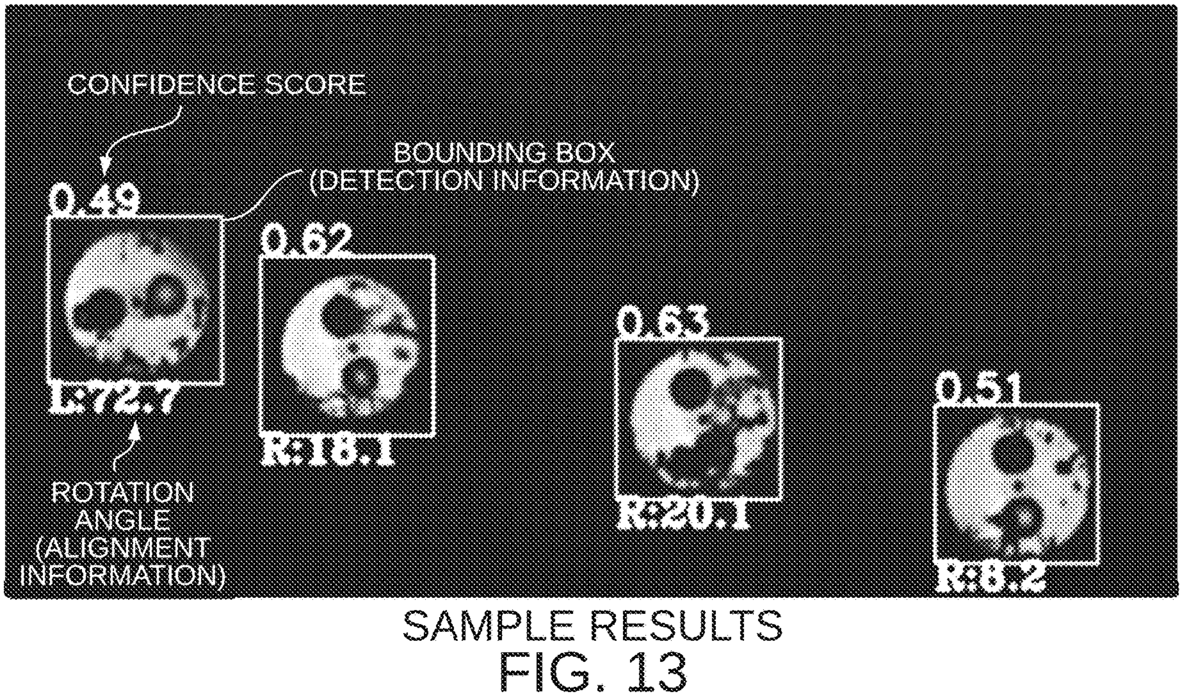
FIG. 13 shows model performance when multiple fibers are detected simultaneously.

FIG. 13 shows model performance when multiple fibers are detected simultaneously. The positions of four contaminated fiber end faces captured by the digital microscope are correctly detected and the misaligned angles are calculated. Thus, the system is able to align multiple fibers at the same time, which provides opportunities for producing polarization-maintaining fiber ribbons.

FIG. 14 is a diagram of a system 1400 having a fiber rotator 1401 operable to align a PM fiber array. In one embodiment, many of the components of system 1400 are the same as like-numbered components shown in FIG. 3. A fiber rotator 1401 is included that receives alignment instructions from the fiber detection and alignment system 301. The fiber rotator 1401 is controlled to rotate each fiber according to the alignment instructions. The fiber rotator 1401 is any suitable hardware operable to selectively rotate and adjust one or more optical fibers in relation to a respective reference key.

FIG. 15 is a diagram of the system 1400 after the fiber rotator 1401 aligns the multiple PM fiber array.

Figure 16:
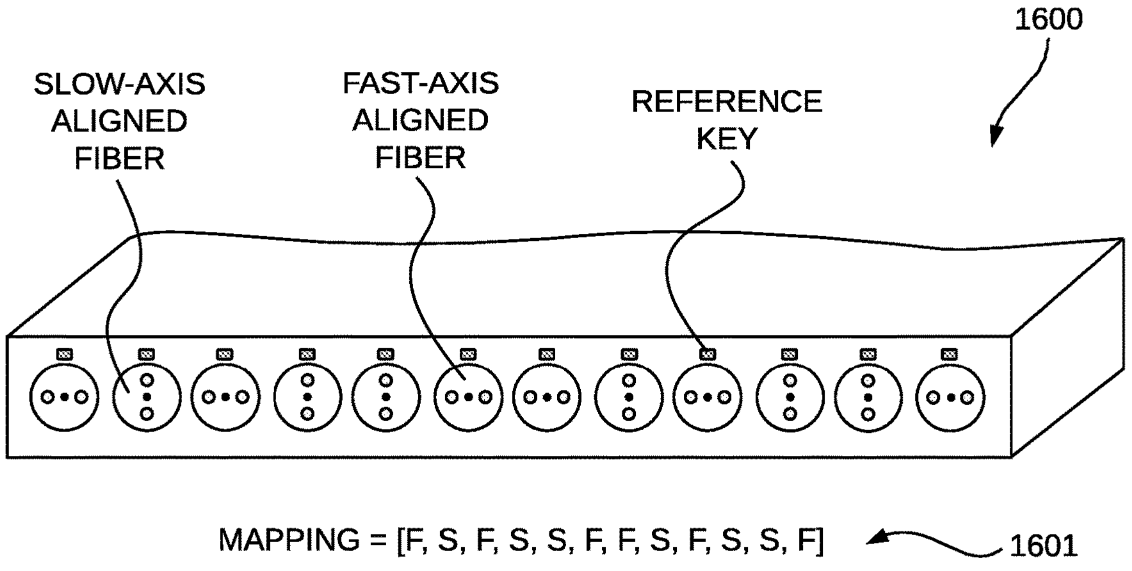
FIG. 16 is a diagram of a PANDA type PM fiber ribbon 1600.

FIG. 16 is a diagram of a PANDA type PM fiber ribbon 1600. As illustrated in FIG. 16, each fiber has been rotated to align a fast or slow axis of the fiber with a reference key. In this example, a mapping 1601 is provided that indicates the orientation of each fiber in the packaged arrangement. These novel systems and techniques can be applied to form packaged arrangements for PM fiber ribbon and PM fiber arrays.

Figure 17:
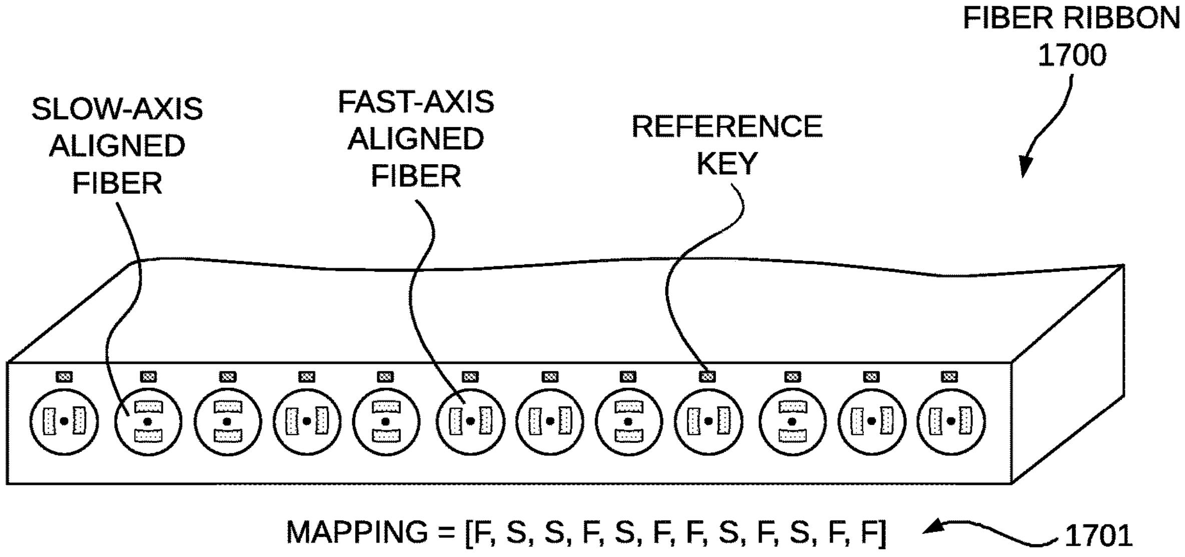
FIG. 17 is a diagram of a Bow-Tie type PM fiber ribbon 1700.

FIG. 17 is a diagram of a Bow-Tie type PM fiber ribbon 1700. As illustrated in FIG. 17, each fiber has been rotated to align a fast or slow axis of the fiber with a reference key. In this example, a mapping 1701 is provided that indicates the orientation of each fiber in the packaged arrangement. These novel systems and techniques can be applied to form packaged arrangements for PM fiber ribbon and PM fiber arrays.

Figure 18:
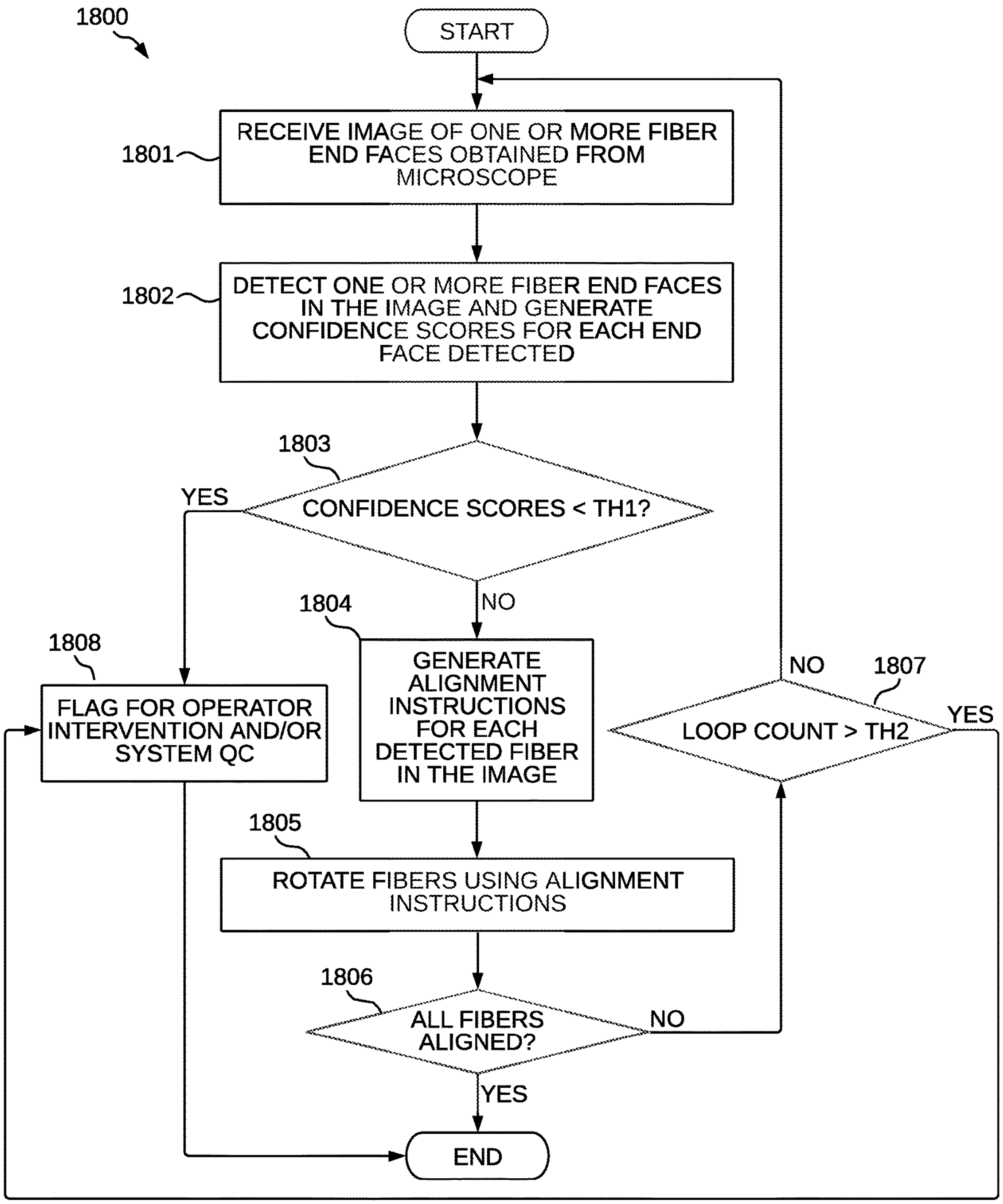
FIG. 18 is a flowchart of a method 1800 for detecting and aligning a fiber.

FIG. 18 is a flowchart of a method 1800 for detecting and aligning one or more fibers. For example, in one embodiment, the method 1800 is performed by the fiber alignment system shown in FIG. 14 and FIG. 15.

At step 1801, an image of one or more fiber end faces obtained via a microscope is received.

At step 1802, the end faces of the fibers in the image are detected. A confidence score is generated for each end face detected. In one embodiment, the confidence score indicates confidence that a bounding box surrounds an end face of a fiber. In other embodiments, the confidence scores indicate confidence in other predicted values.

At step 1803, each confidence score is evaluated to determine if a confidence is below a threshold TH1. If any of the confidence scores is less than the threshold TH1, then the method proceeds to step 1808 for operator intervention and/or quality control measures. If none of the confidence scores is less than the threshold TH1, then the method proceeds to step 1804. The threshold TH1 is configurable by an operator or system provider.

At step 1804, an alignment instruction is generated for each fiber from the image. For each detected fiber, the alignment instruction aligns an axis of each fiber to an associated reference key. The alignment instruction includes a rotation angle (e.g., degrees or radians) and direction (e.g., "clockwise/counterclockwise" or "right/left").

At step 1805, each fiber is rotated using the alignment instruction.

At step 1806, a check is performed to confirm that all fibers are aligned. This may be performed manually via an operator or automated using the system. If the fibers are all aligned, then the method terminates. If not all fibers are aligned, then the method proceeds to step 1807.

At step 1807, a check is performed to determine whether a number of times that the method has been repeated is greater than a threshold TH2 (e.g., 3 times). If the number of times that the method has been repeated is greater than the threshold TH2, then the method proceeds to step 1808. If the number of times that the method has been repeated is less than or equal to the threshold TH2, then the method repeats by proceeding to step 1801. The threshold TH2 is configurable by an operator or system provider.

At step 1808, a flag for operator intervention and/or system quality control is activated.

Figure 19:
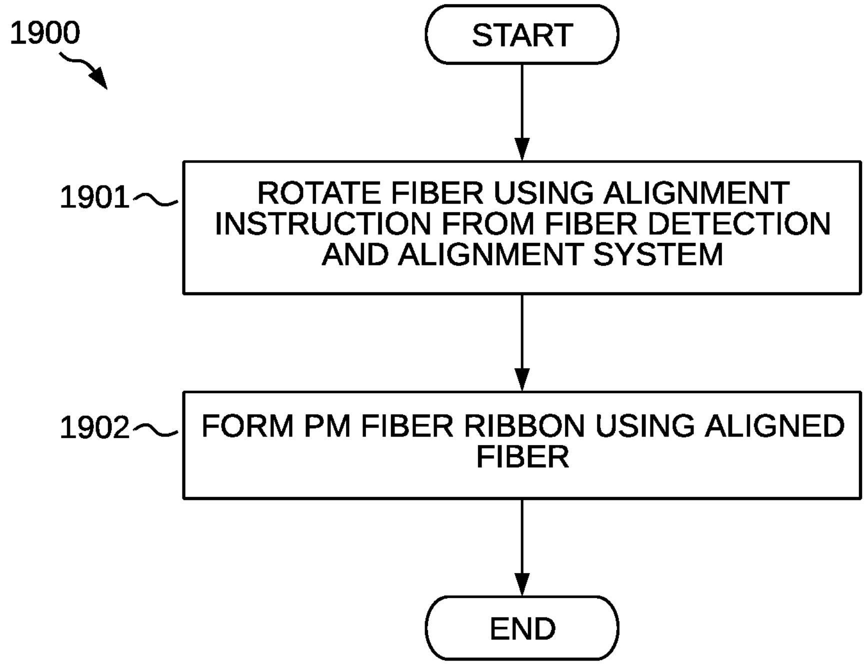
FIG. 19 is a flowchart of a method 1900 for forming a PM fiber ribbon using a fiber detection and alignment system.

FIG. 19 is a flowchart of a method 1900 for forming a PM fiber ribbon using a fiber detection and alignment system.

At step 1901, the PM fiber is rotated using alignment instructions from a fiber detection and alignment system.

At step 1902, the PM fiber is formed into a PM fiber ribbon. This method can be used to scalably package an arbitrary number of PM fibers into a PM fiber ribbon.

Although certain specific embodiments are described above for instructional purposes, the teachings of this patent document have general applicability and are not limited to the specific embodiments described above. In other embodiments, non-neural network-based techniques are employed to identify fiber end faces and predict rotation angle and direction information. For example, support vector machines (SVM), K-Nearest Neighbors (KNN), or other machine learning algorithms are used to identify fiber end faces and predict rotation angle and direction information instead of neural network based approaches. In another embodiment, a vision based large multimodal model (LMM) receives an image having one or more fiber end faces. The LMM is prompted to identify a fiber end face and to predict rotation angle and direction information for each detected fiber end face. Accordingly, various modifications, adaptations, and combinations of various features of the described embodiments can be practiced without departing from the scope of the invention as set forth in the claims.

What is claimed is:

1. A non-transitory computer-readable medium storing instructions that, when executed by a processor, cause the processor to perform a method, the method comprising:

receiving an image of one or more end faces of one or more fibers;

using a first-stage neural network to generate one or more cropped images, wherein each cropped image contains the end face of one of the one or more fibers; and using a second-stage neural network to generate an alignment instruction for each of the one or more fibers, wherein the alignment instruction includes a rotation angle and direction that aligns an axis of the fiber with a reference key.

2. The non-transitory computer-readable medium of claim 1, wherein the one or more fibers are polarization-maintaining (PM) optical fibers.

3. The non-transitory computer-readable medium of claim 1, wherein the axis is a fast axis or a slow axis.

4. The non-transitory computer-readable medium of claim 1, wherein the first-stage neural network is trained using a plurality of training images and corresponding bounding box labels, wherein each bounding box label includes denormalized bounding box coordinates, wherein the second-stage neural network is trained using the cropped images and corresponding rotational alignment labels belonging to (−90°, 90°], and wherein each rotational alignment label is encoded as sine and cosine values of a doubled rotational angle.

5. The non-transitory computer-readable medium of claim 4, wherein the bounding box labels include a class name, an x-center coordinate, a y-center coordinate, a width, and a height.

6. The non-transitory computer-readable medium of claim 1, wherein the second-stage neural network receives square-cropped images generated by cropping a longer dimension of each image to match its shorter dimension.

7. The non-transitory computer-readable medium of claim 4, wherein the rotational alignment labels are derived from stress-rod center annotations of PM fibers.

8. The non-transitory computer-readable medium of claim 1, wherein the first-stage neural network comprises a YOLO-based detector and the second-stage neural network comprises a residual convolutional neural network.

9. The non-transitory computer-readable medium of claim 4, wherein the training images are generated by:

obtaining images of fiber end faces under differing conditions, including contamination, scratches, cracks, variable illumination, out-of-focus conditions, and differing magnification levels;

augmenting the images for training the first-stage neural network using at least one of cropping, pixel noise, distortion, contrast adjustment, or blur; and augmenting the images for training the second-stage neural network by rotating each image from a first rotation angle D1 to a second rotation angle D2 and optionally applying augmentations that maintain a geometric relationship between stress-rod positions and rotational alignment angle.

10. The non-transitory computer-readable medium of claim 9, wherein augmenting the images for training the first-stage neural network preserves spatial integrity of fiber features, such that corresponding bounding box labels remain valid after augmenting.

11. The non-transitory computer-readable medium of claim 9, wherein images captured under different conditions share a common rotational alignment label derived from a corresponding clear image of the same fiber.

12. The non-transitory computer-readable medium of claim 9, wherein the differing magnification levels include at least two digital microscope magnifications used during PM fiber inspection.

13. The non-transitory computer-readable medium of claim 9, wherein relative positions of one or more fiber stress rods with respect to a fiber core remain valid after augmenting the images for training the second-stage neural network.

14. The non-transitory computer-readable medium of claim 9, wherein obtaining the images comprises:

cleaning the fiber end face;

adding contamination;

removing contamination and adding scratches or cracks; and re-adding contamination.

15. The non-transitory computer-readable medium of claim 4, wherein the encoded rotational alignment angle avoids a discontinuity between angles that correspond to visually identical fiber images.

16. The non-transitory computer-readable medium of claim 4, wherein the doubled rotational angle is represented as $\theta'=2\times\theta$.

17. The non-transitory computer-readable medium of claim 4, wherein the sine and cosine values are used to compute a loss function comparing predicted and ground-truth rotational alignment information.

18. The non-transitory computer-readable medium of claim 4, wherein the encoded rotational alignment labels form part of a training dataset for PM fiber alignment.

* * * * *